US010296185B2

(12) United States Patent
Chang et al.

(10) Patent No.: US 10,296,185 B2
(45) Date of Patent: *May 21, 2019

(54) VIEWING SELECTED ZOOMED CONTENT

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/818,781

(22) Filed: Aug. 5, 2015

(65) Prior Publication Data

US 2016/0147417 A1    May 26, 2016

Related U.S. Application Data

(63) Continuation of application No. 14/552,861, filed on Nov. 25, 2014.

(51) Int. Cl.
| | | |
|---|---|---|
| *G06F 3/0481* | (2013.01) | |
| *G06F 3/0482* | (2013.01) | |
| *G06F 3/0483* | (2013.01) | |
| *G06F 3/14* | (2006.01) | |
| *G06F 3/0484* | (2013.01) | |

(52) U.S. Cl.
CPC ...... *G06F 3/04842* (2013.01); *G06F 3/04845* (2013.01); *G06F 3/04847* (2013.01); *G06F 3/1454* (2013.01); *G06F 3/1438* (2013.01); *G06F 2203/04806* (2013.01)

(58) Field of Classification Search
CPC .... G06F 3/0481; G06F 3/0482; G06F 3/0483; G06F 3/04817; H04N 5/44543
See application file for complete search history.

(56) References Cited

U.S. PATENT DOCUMENTS

| | | | |
|---|---|---|---|
| 5,026,158 A | 6/1991 | Golubic | |
| 5,166,878 A | 11/1992 | Poelstra | |
| 6,300,947 B1 | 10/2001 | Kanevsky | |
| 6,956,589 B2 * | 10/2005 | Lipsky | G06F 3/0481 |
| | | | 345/667 |
| 7,469,099 B2 | 12/2008 | Terayama | |
| 7,658,611 B2 | 2/2010 | Jackson | |

(Continued)

OTHER PUBLICATIONS

Alface, P.R. et al., "Requirements for the Network Interfaces and Interactive Systems Usability", Version of Jan. 31, 2012, © FascinatE consortium, Total 36 pp.

(Continued)

*Primary Examiner* — Ryan F Pitaro
*Assistant Examiner* — Erik V Stitt
(74) *Attorney, Agent, or Firm* — Janaki K. Davda; Konrad, Raynes, Davda & Victor LLP

(57) ABSTRACT

Provided are techniques for viewing selected zoomed content. A first device is paired with a second device to enable the first device and the second device to communicate. Content is displayed on a first display screen on the first device. In response to receiving a request to zoom a portion of the content on the first device, a zoomed portion of the content is displayed on a second display screen on the second device, without changing the display of the content on the first display screen on the first device.

7 Claims, 6 Drawing Sheets

(56) References Cited

U.S. PATENT DOCUMENTS

| | | | |
|---|---|---|---|
| 7,966,638 B2* | 6/2011 | Gossweiler, III | H04N 21/235 725/133 |
| 8,756,532 B2* | 6/2014 | Poon | G06F 3/04842 340/5.83 |
| 9,628,145 B2* | 4/2017 | Ko | H04B 5/0031 |
| 2001/0045949 A1* | 11/2001 | Chithambaram | G01C 21/20 345/418 |
| 2002/0126142 A1* | 3/2002 | Hodgkinson | G09G 5/00 345/719 |
| 2002/0113805 A1* | 8/2002 | Li | G06F 3/04815 345/649 |
| 2004/0008048 A1* | 1/2004 | Florence, Jr. | G01R 1/07314 324/754.13 |
| 2004/0075671 A1* | 4/2004 | Vale | G09G 5/005 345/660 |
| 2006/0050090 A1* | 3/2006 | Ahmed | G09G 5/391 345/660 |
| 2006/0259193 A1 | 11/2006 | Wang et al. | |
| 2007/0064143 A1 | 3/2007 | Soler et al. | |
| 2008/0278481 A1 | 11/2008 | Aguera y Areas et al. | |
| 2009/0153691 A1 | 6/2009 | Aoyama et al. | |
| 2011/0006971 A1* | 1/2011 | Ebey | G06F 1/1616 345/1.3 |
| 2011/0181780 A1* | 7/2011 | Barton | H04N 21/4126 348/563 |
| 2011/0184862 A1* | 7/2011 | Lanier | G06Q 20/102 705/40 |
| 2011/0258563 A1* | 10/2011 | Lincke | G06F 17/30905 715/760 |
| 2011/0265118 A1* | 10/2011 | Choi | H04N 5/4401 725/37 |
| 2012/0068922 A1* | 3/2012 | Nobakht | G06F 3/0219 345/156 |
| 2013/0047093 A1* | 2/2013 | Reuschel | G06F 3/04883 715/753 |
| 2013/0111332 A1* | 5/2013 | Davis | G06F 3/0488 715/247 |
| 2014/0215379 A1* | 7/2014 | Purdy | G06F 3/0481 715/781 |
| 2015/0039692 A1* | 2/2015 | Goncalves | H04L 51/20 709/204 |
| 2016/0085381 A1* | 3/2016 | Parker | G06F 3/1454 715/753 |
| 2016/0344942 A1* | 11/2016 | Julin | G06T 3/40 |
| 2017/0010848 A1* | 1/2017 | Hinckley | G06F 3/0483 |

OTHER PUBLICATIONS

Baudisch, P., X. Xie, C. Wang, and W. Ma, "Collapse-to-Zoom: Viewing Web Pages on Small Screen Devices by Interactively Removing Irrelevant Content", UIST 2004 Proceedings of the 17th Annual ACM Symposium on User Interface Software and Technology, Total 4 pp. (Also available at: http://research.microsoft.com/en-us/people/xingx/CollapseToZoom.pdf).

Mun, S.K., "Coordinated Approach to Breast Cancer Diagnosis and Treatment for the Military (Core Program)", Georgetown Univ Washington DC, 1994, Report Date: Dec. 19, 1994, Total 17 pp.

List of IBM Patents or Patent Applications Treated as Related, Total 2 pp, Aug. 5, 2015.

U.S. Appl. No. 14/552,861, filed Nov. 25, 2014, entitled, "Viewing Selected Zoomed Content", invented by B.W. Chang et al., Total 21 pp. [57.332 (Appln)].

Preliminary Amendment, Aug. 5, 2015, for U.S. Appl. No. 14/552,861, filed Nov. 25, 2014 by B.W. Chang et al., Total 5 pp. [57.332 (PrelimAmend)].

Office Action, dated Apr. 26, 2017, for U.S. Appl. No. 14/552,861 (57.332), filed Nov. 25, 2014, Total 10 pages.

Response to Office Action, dated Jul. 21, 2017, for U.S. Appl. No. 14/552,861 (57.332), filed Nov. 25, 2014, Total 10 pages.

Final Office Action, dated Nov. 16, 2017, for U.S. Appl. No. 14/552,861, filed Nov. 25, 2014 by B.W. Chang et al., Total 15 pp. [57.332 (FOA)].

Response to Final Office Action, dated Feb. 14, 2018, for U.S. Appl. No. 14/552,861, filed Nov. 25, 2014 by B.W. Chang et al., Total 11 pp. [57.332 (RFOA)].

Office Action 3, dated Mar. 28, 2018, for U.S. Appl. No. 14/552,861, filed Nov. 25, 2014 by B.W. Chang et al., Total 18 pp. [57.332 (OA3)].

Response to Office Action 3, dated Jun. 21, 2018, for U.S. Appl. No. 14/552,861, filed Nov. 25, 2014 by B.W. Chang et al., Total 19 pp. [57.332 (ROA3)].

Notice of Allowance for U.S. Appl. No. 14/552,861, p. 12, dated Jan. 3, 2019.

* cited by examiner

VIEWING SELECTED ZOOMED CONTENT

FIELD

Embodiments of the invention relate to viewing selected zoomed content.

BACKGROUND

With a touch screen device, there is a functionality to zoom selected, partial content. In this case, zooming of partial content refers to zooming of a text portion, an image portion, a map section, etc. When there is zooming of selected, partial content, some of the unselected content may be covered by the selected, zoomed content. For example, a newspaper article may show an image next to text. If a user zooms in on the image, the image is enlarged and covers some of the text.

SUMMARY

Provided is a method for viewing selected zoomed content. The method comprises: pairing, with a processor of a first device, the first device with a second device to enable the first device and the second device to communicate; displaying content on a first display screen on the first device; and, in response to receiving a request to zoom a portion of the content on the first device, displaying a zoomed portion of the content on a second display screen on the second device, without changing the display of the content on the first display screen on the first device.

Provided is a computer program product viewing selected zoomed content. The computer program product comprises a first computer readable storage medium having first program code embodied therewith on a first device and a second computer readable storage medium having second program code embodied therewith on a second device, the first program code and the second program code each executable by at least one processor to perform: pairing a first device with a second device to enable the first device and the second device to communicate; displaying content on a first display screen on the first device; and, in response to receiving a request to zoom a portion of the content on the first device, displaying a zoomed portion of the content on a second display screen on the second device, without changing the display of the content on the first display screen on the first device.

Provided is a computer system viewing selected zoomed content. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: pairing a first device with a second device to enable the first device and the second device to communicate; displaying content on a first display screen on the first device; and, in response to receiving a request to zoom a portion of the content on the first device, displaying a zoomed portion of the content on a second display screen on the second device, without changing the display of the content on the first display screen on the first device.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
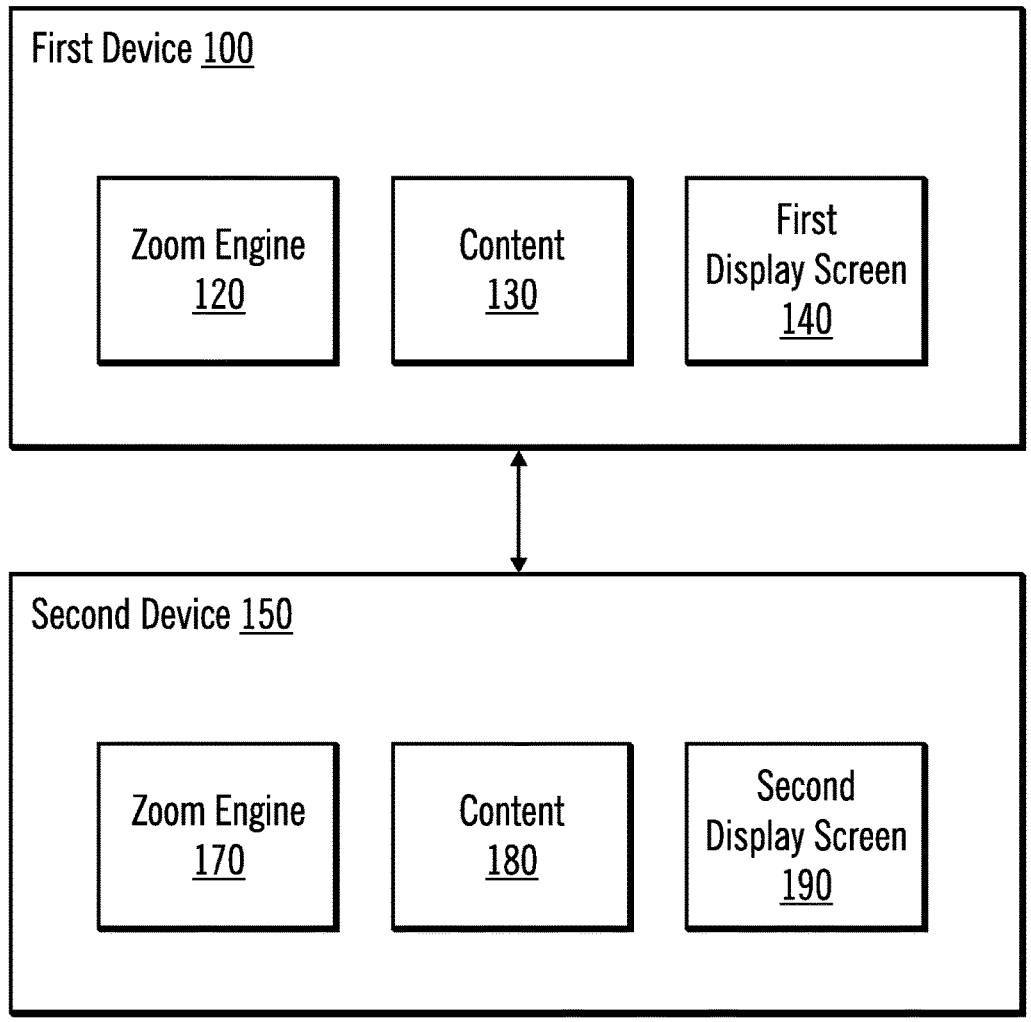
FIG. 1 illustrates, in a block diagram, a computing environment in accordance with certain embodiments.

FIG. 1 illustrates, in a block diagram, a computing environment in accordance with certain embodiments. A first device 100 is coupled to a second device 150. Although two devices are shown, any number of devices may be used in embodiments of the invention. The A first device 100 includes a zoom engine 120, content 130, and a first display screen 140. The second device 150 includes a zoom engine 170, content 180, and a second display screen 190. Zoom engine 120 and zoom engine 170 communicate and work together to allow a portion of content 130 to be shown as zoomed (via a zoom operation) on the second display screen 190. In various embodiments, the content 180 may be a copy of the content 130 or may be a subset of the content 130.

With embodiments, when content 130 is displayed on the first display screen 140 and is selected for zooming in the first device 100, the content 130 remains unchanged in the first device 100, but the zoom engine 120 communicates with the zoom engine 170 to have the zoomed content displayed on the second display screen 190. Then, a user is able to see the entire content 130 on the first display screen 140, while seeing a zoomed portion of the content on the second display screen 190.

By having the partial content to be zoomed transferred to the second device 150 and displayed on the second display screen 190, the zoom engines 120, 170 avoid having the zoomed content blocking viewing of the original content.

With the zoom engine 120 on the first device 100, a user may select any content (e.g., a text portion, an image portion, a map portion, etc.) to be zoomed, and the zoom engine 120 communicates this request to the zoom engine 170, which displays the zoomed content on the second display screen 190 for viewing by the user.

Because the first device 100 shows the entire content, the user can view the other associated content on the first display screen 140.

In certain embodiments, the user may view the "street view" in the first display screen 140 on the first device 100 and the associated map is displayed on the second display screen 190 on the second device 150. A street view may be described as a set of street-level images (e.g., photographs of a street taken from street-level to show buildings, parks, etc. on that street).

Figure 2:
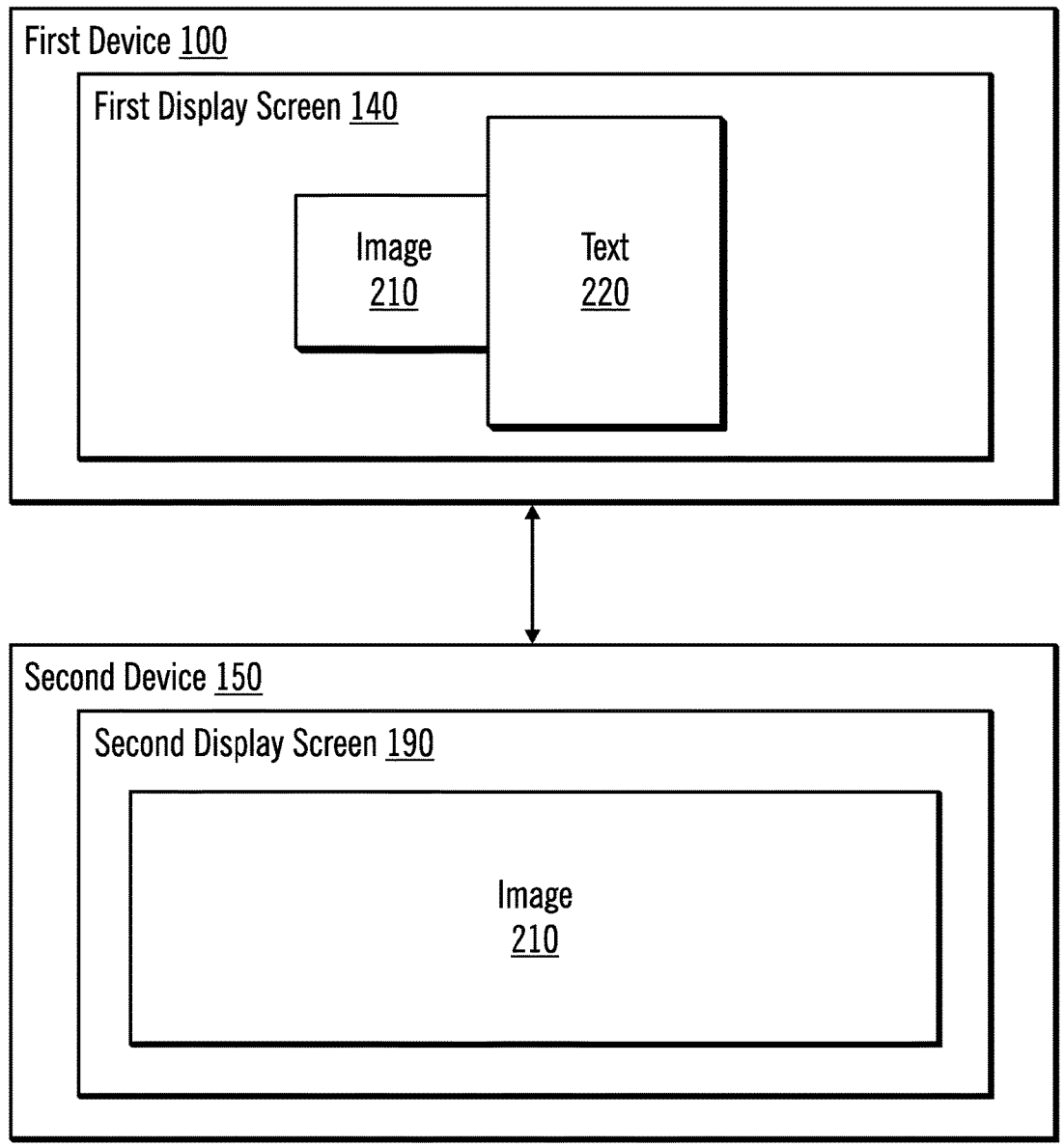
FIG. 2 illustrates an example of zooming on content using two devices in accordance with certain embodiments.

FIG. 2 illustrates an example of zooming on content using two devices in accordance with certain embodiments. In FIG. 2, the first display screen 140 on the first device 100 displays an image 210 adjacent to text 220. Although not shown in FIG. 2, the first device 100 also includes the zoom engine 120 and the content 130, while the second device 150 includes the zoom engine 170 and the content 180. In FIG. 2, a user has selected (e.g., by using a device, such as a mouse or finger) the image 210 for zooming. In response to the user requesting to zoom in on the image 210, the zoom engine 120 communicates the request to the zoom engine 170, and the zoom engine 170 displays the zoomed image 210 on the second display screen 190 on the second device 150.

Figure 3:
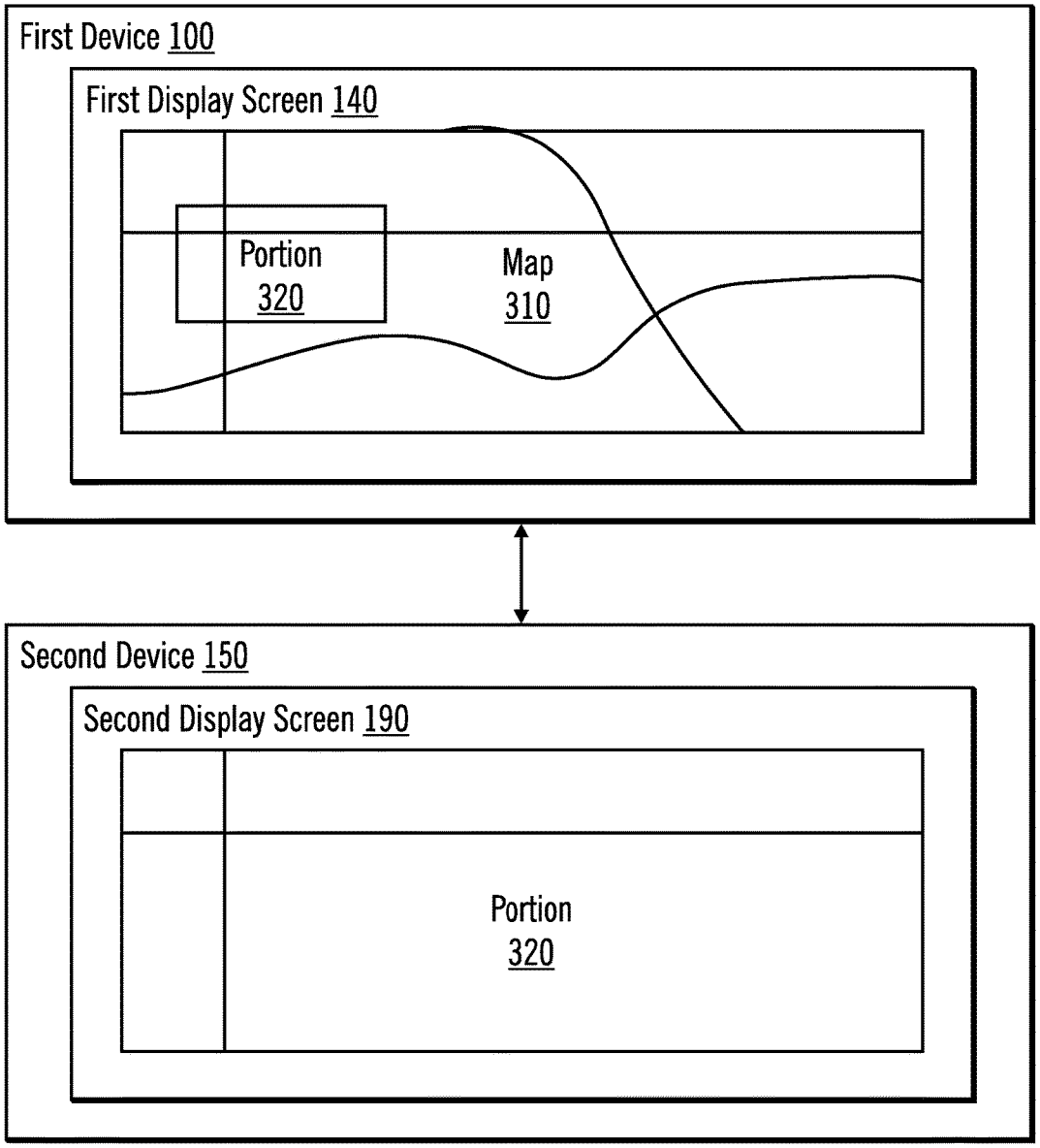
FIG. 3 illustrates another example of zooming on content using two devices in accordance with certain embodiments.

FIG. 3 illustrates another example of zooming on content using two devices in accordance with certain embodiments. In FIG. 3, the first display screen 140 on the first device 100 displays a map 310. Although not shown in FIG. 3, the first device 100 also includes the zoom engine 120 and the content 130, while the second device 150 includes the zoom engine 170 and the content 180. In FIG. 3, a user has selected (e.g., by using a device, such as a mouse or finger) a portion 320 to be zoomed in. In response to the user's selection of the portion 320 of the map, the zoom engine 120 communicates the request to the zoom engine 170, and the zoom engine 170 displays the zoomed portion 320 of the map on the second display screen 190 on the second device 150.

Thus, the zoomed content displayed on the second display screen 190 does not provide a distraction for the user and does not obstruct any of the original content on the first display screen 140.

Figure 4A:
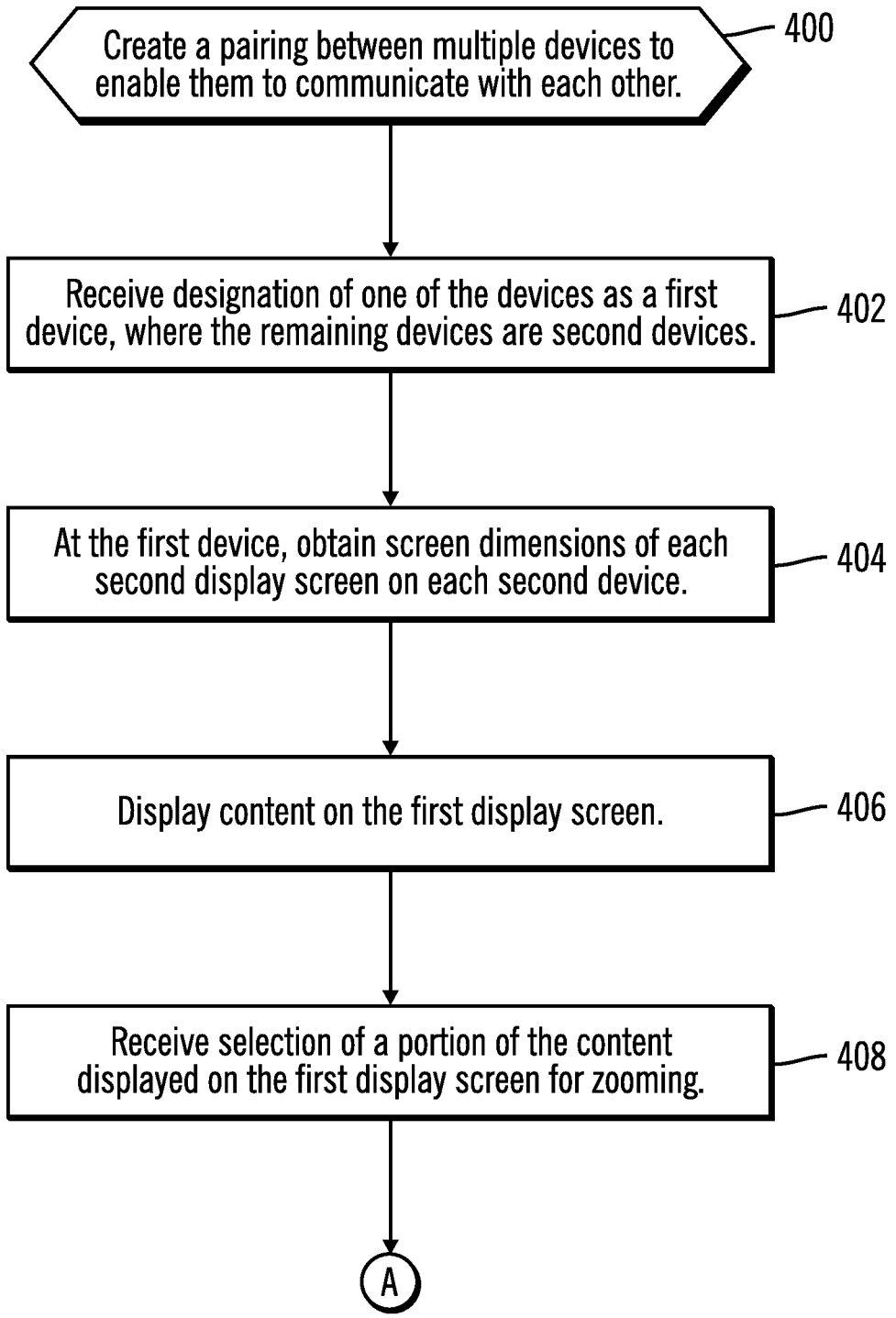
FIGS. 4A and 4B illustrate, in a flow diagram, operations for zooming in on a portion of content in accordance with certain embodiments.
Figure 4B:
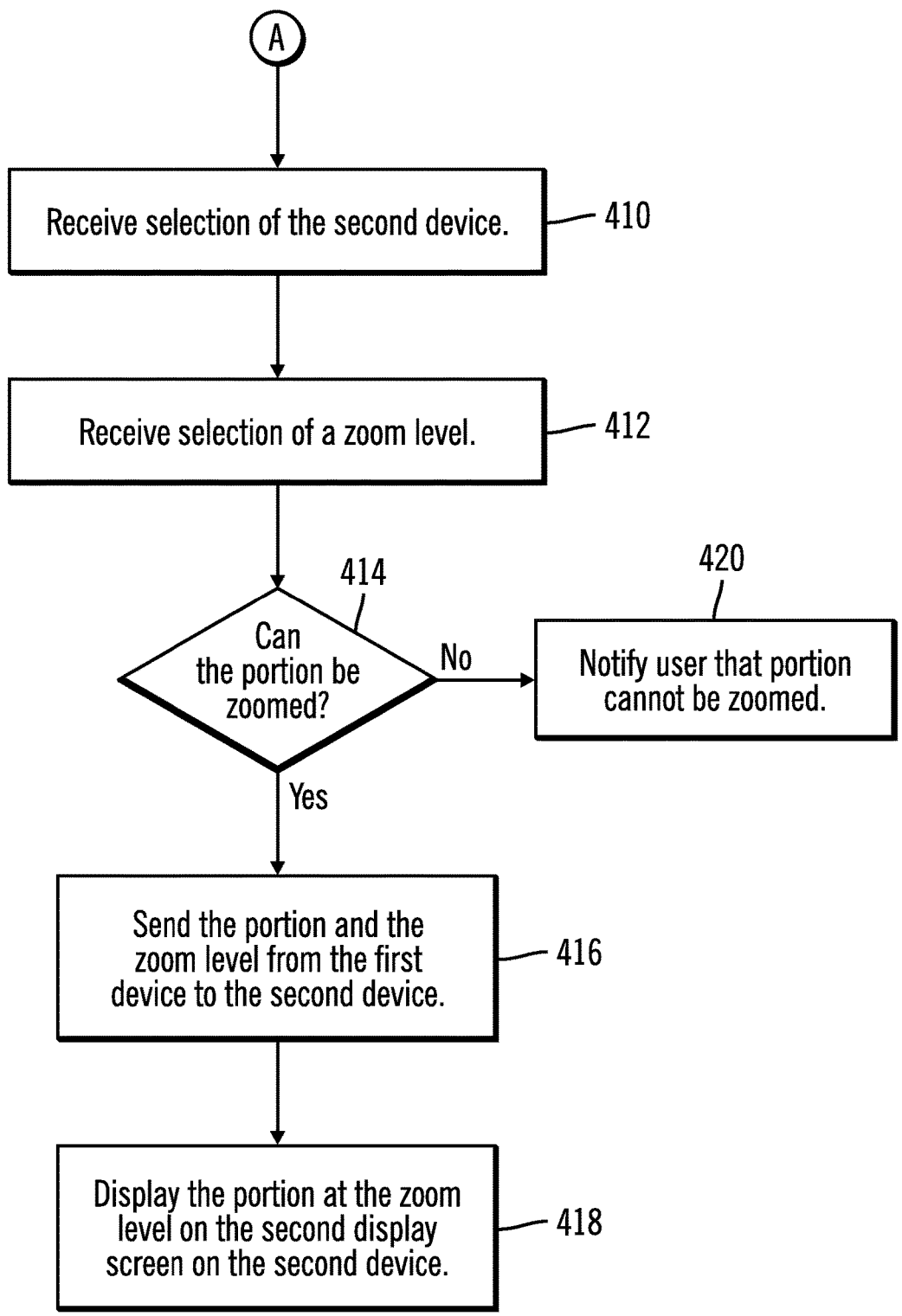

FIGS. 4A and 4B illustrate, in a flow diagram, operations for zooming in on a portion of content in accordance with certain embodiments. Control begins at block 400 with the zoom engines at each of multiple devices creating a pairing between the multiple devices to enable them to communicate with each other. Each of the computing devices has a display screen for display content or a portion of content. In certain embodiments, a user uses the zoom engines to create the pairing. In certain embodiments, the zoom engines at the multiple devices communicate with each other via a local area wireless technology ("WiFi") or via Bluetooth wireless technology.

In block 402, the zoom engines receive designation of one of the computing devices as a first device, and then the remaining computing devices are designated as second devices. A user may change this designation so that a different computing device becomes the first device.

In block 404, the zoom engine on the first device obtains screen dimensions of each second display screen on each second device. In block 406, the zoom engine on the first device displays content on a first display screen. In block 408, the zoom engine on the first device receives selection of a portion of the content displayed on the first display screen for zooming. From block 408, processing continues to block 410 (FIG. 4B).

With reference to the processing of block 408, if text is selected, then the zoom engine on the first device gathers the font size of the selected text; and, if an image or map section is selected, then the zoom engine on the first device identifies an area dimension. This information is used to apply the zoom operation to the selected portion. In certain embodiments, the first device collects this information and sends the information to the second device. The second device uses the information to perform the zoom operation.

In block 410, the zoom engine on the first device receives selection of a second device. In certain embodiments, one of the multiple devices may be set as a default, second device, and this operation is skipped. In block 412, the zoom engine on the first device receives selection of a zoom level.

In block 414, the zoom engine on the first device determines whether the portion can be zoomed on the second device. If so, processing continues to block 416, otherwise, processing continues to block 420. For example, the zoom engine on the first device may determine that the screen dimensions on the second device will not accommodate zooming the portion at the zoom level, and processing will go from block 414 to block 420.

In block 416, the zoom engine on the first device sends the portion and the zoom level to the zoom engine on the second device. In certain embodiments, the zoom engine on the first device performs the zoom operation and sends the zoomed portion to the zoom engine on the second device. In certain embodiments, the zoom engine on the second device receives the portion and the zoom level and performs the zoom operation. In block 418, the zoom engine on the second device displays the portion at the zoom level on the second display screen.

In block 420, the zoom engine on the first device notifies a user that the selected portion cannot be zoomed.

In certain embodiments, the first device may be a mobile computing device (e.g., a smart phone, a laptop computer, etc.), a non-mobile computing device (e.g., a desktop computer, etc.), a television, etc. In certain embodiments, the second device may be a mobile computing device (e.g., a smart phone, a laptop computer, etc.), a non-mobile computing device (e.g., a desktop computer, etc.), a television, etc. This allows the user to make use of larger screen sizes for viewing the zoomed content. Embodiments provide the ability to zoom in (using an external screen) on a portion of content, without hampering the use of the initiating, first device (which may have a relatively small display screen), which is not consumed by the zoomed image.

Figure 5:
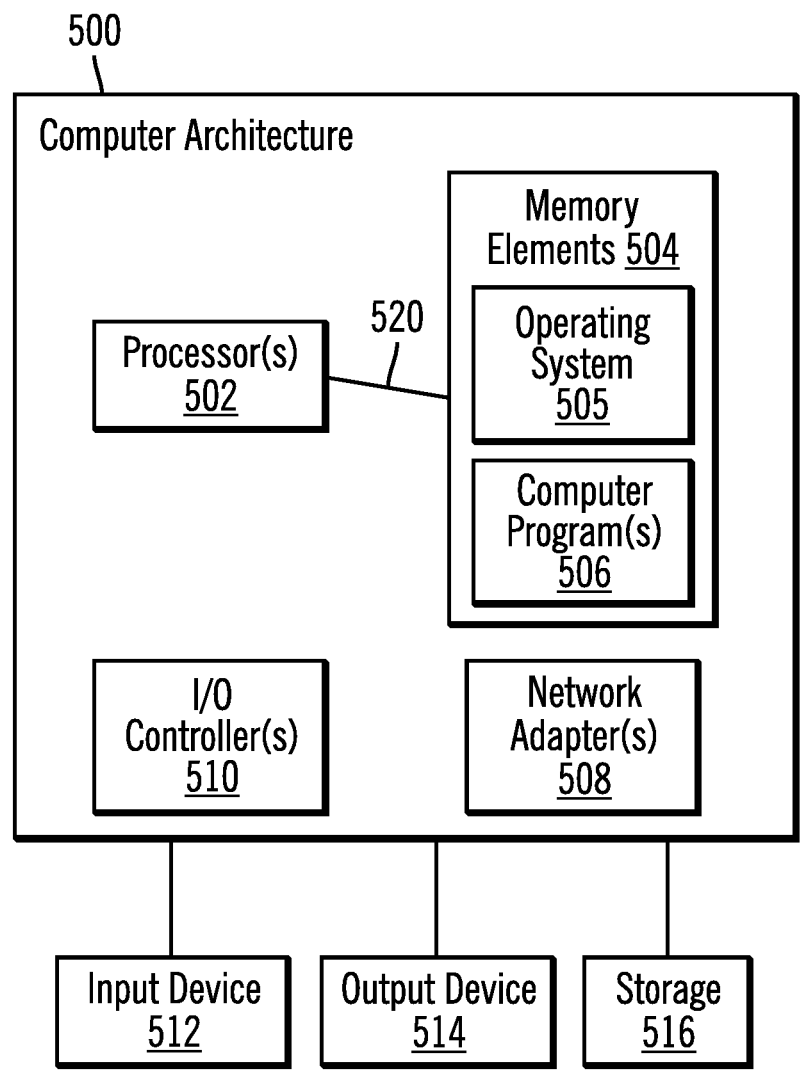
FIG. 5 illustrates, in a block diagram, a computer architecture that may be used in accordance with certain embodiments.

FIG. 5 illustrates a computer architecture 500 that may be used in accordance with certain embodiments. In certain embodiments, computing devices 100 and/or 150 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
pairing a plurality of devices;
designating one of the plurality of devices as a first device;
designating remaining devices of the plurality of devices as second devices forming a plurality of second devices;
obtaining, by the first device, screen dimensions of each display screen of the plurality of second devices;
displaying, by the first device, multiple portions of content on a first display screen on the first device;
receiving, by the first device, a request to zoom a portion of the multiple portions of the content on the first display screen on the first device;
receiving, by the first device, a selection of a second device from the plurality of second devices;
receiving, by the first device, a selection of a zoom level; and
in response to determining that screen dimensions of a second display screen of the second deceive can accommodate the portion zoomed, sending, by the first device, the portion and the zoom level to the second device, wherein the second device zooms the portion to the zoom level and displays the portion zoomed on the second display screen, and wherein the multiple portions remain displayed on the first display screen on the first device.

2. The method of claim 1, further comprising:
under control of the first device,
storing the screen dimensions of each display screen of the plurality of second devices; and
in response to determining that screen dimensions of the second display screen of the second device cannot accommodate the portion zoomed, providing an indication that the portion cannot be zoomed.

3. The method of claim 1, wherein the portion of the content is at least one of text, an image, and a map.

4. The method of claim 1, wherein the second display screen is larger than the first display screen.

5. The method of claim 1, wherein a different one of the plurality of devices is designated as the first device.

6. The method of claim 1, further comprising:
in response to the portion being text, determining a font size of the text; and
in response to the portion being an image, determining an area dimension of the image.

7. The method of claim 1, wherein the multiple portions of the content on the first display screen on the first device comprise a street view with photographs.

* * * * *